United States Patent
Beigel et al.

(10) Patent No.: US 9,430,728 B2
(45) Date of Patent: *Aug. 30, 2016

(54) ELECTRONIC IDENTIFICATION SYSTEM WITH IMPROVED SENSITIVITY

(76) Inventors: Michael L. Beigel, Corona, CA (US);
Nathaniel Polish, New York, NY (US);
Steven R. Frank, Golden, CO (US);
Robert E. Malm, Pacific Palisades, CA (US)

( * ) Notice: Subject to any disclaimer, the term of this patent is extended or adjusted under 35 U.S.C. 154(b) by 1889 days.

This patent is subject to a terminal disclaimer.

(21) Appl. No.: 12/748,428

(22) Filed: Mar. 28, 2010

(65) Prior Publication Data

US 2010/0182127 A1 Jul. 22, 2010

Related U.S. Application Data

(63) Continuation of application No. 10/064,380, filed on Jul. 8, 2002, now Pat. No. 7,737,821.

(51) Int. Cl.
*H04Q 5/22* (2006.01)
*G08C 19/16* (2006.01)
*G08B 13/14* (2006.01)
*G08B 23/00* (2006.01)
*H01Q 11/12* (2006.01)
*H04B 1/04* (2006.01)
*H04B 5/00* (2006.01)
*G06K 19/07* (2006.01)
*G06K 7/00* (2006.01)

(52) U.S. Cl.
CPC ......... *G06K 19/0726* (2013.01); *G06K 7/0008* (2013.01); *G06K 19/0723* (2013.01)

(58) Field of Classification Search
CPC ........... G06K 7/0008; G06K 19/0723; G06K 7/10336; G06K 19/0726; G06K 7/086; G06K 7/10178; G06K 19/07749; G06K 7/10297; G08B 13/2417; G08B 13/2462; G08B 13/2477; H01M 10/425; H01M 10/44; H01M 10/46
USPC ............... 340/10.1, 10.3, 10.34, 10.4, 572.1, 340/573.1, 12.1, 12.11, 12.16, 12.17; 455/127, 41, 274, 280, 294; 375/271, 375/273

See application file for complete search history.

(56) References Cited

U.S. PATENT DOCUMENTS 3,970,824 A * 7/1976 Walton et al. ............. 340/10.34
4,333,072 A * 6/1982 Beigel ....................... 340/10.34

(Continued)

*Primary Examiner* — Amine Benlagsir
*Assistant Examiner* — Emily C Terrell
(74) *Attorney, Agent, or Firm* — Robert E. Malm

(57) ABSTRACT

The electronic identification system provides two-way communications between reader and tags using alternating magnetic fields established by the reader and tag. Communication is accomplished by utilizing either a one-step or a two-step modulation process in which the information to be communicated either modulates an alternating magnetic field directly or modulates a periodic signal which modulates an alternating magnetic field. The coil in the reader that is used to establish an alternating magnetic field is transformer-coupled through capacitors to a push-pull driving circuit consisting of four field-effect transistors connected in a bridge arrangement. The coil, capacitors, and coupling circuitry are maintained in a tuned condition by continually adjusting either the driving frequency, the coil inductance, or the capacitor capacitance during communications. A tag utilizes a coil to couple with the reader's alternating magnetic field and a capacitor to resonate the coil, thereby extracting power from the field more efficiently. Transformer coupling of the coil and capacitor is utilized for improved impedance matching. The coil, capacitor, and coupling circuitry can be maintained in a tuned condition by continually adjusting either the coil inductance, or the capacitor capacitance during communications. Certain configurations of the system may require that tuning maintenance be discontinued during the transmission of data.

1 Claim, 12 Drawing Sheets

(56) References Cited

U.S. PATENT DOCUMENTS

| | | | |
|---|---|---|---|
| 4,912,471 A * | 3/1990 | Tyburski et al. | 340/10.34 |
| 5,517,194 A * | 5/1996 | Carroll et al. | 340/10.34 |
| 5,519,729 A * | 5/1996 | Jurisch et al. | 375/259 |
| 5,610,384 A * | 3/1997 | Goto | 235/435 |
| 6,211,786 B1 * | 4/2001 | Yang et al. | 340/572.5 |
| 7,123,129 B1 * | 10/2006 | Schrott et al. | 340/10.1 |
| 2003/0024985 A1 * | 2/2003 | Reis | 235/451 |
| 2003/0178483 A1 * | 9/2003 | Wakabayashi | 235/380 |

* cited by examiner

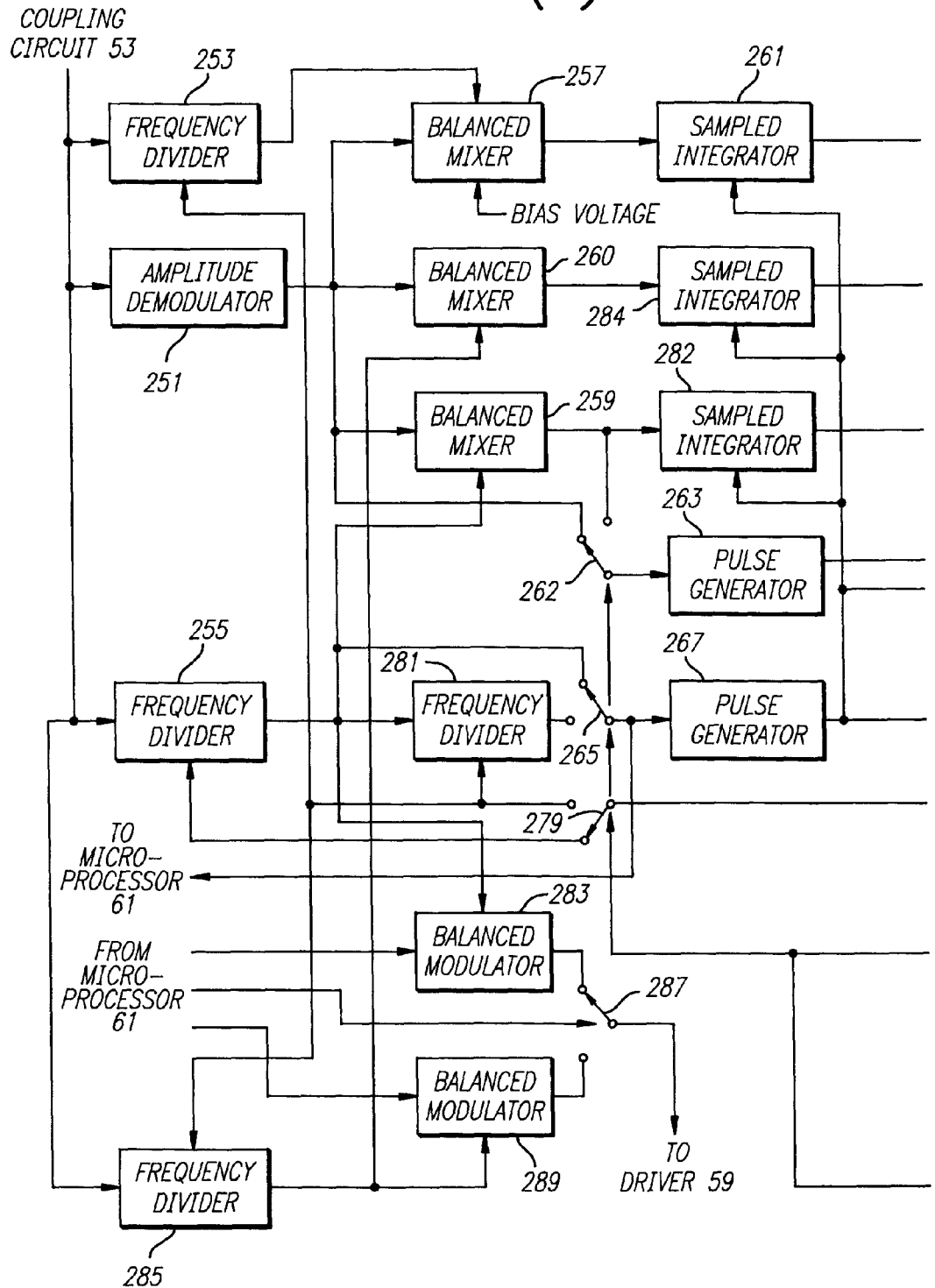

ELECTRONIC IDENTIFICATION SYSTEM WITH IMPROVED SENSITIVITY

This application is a continuation of application Ser. No. 10/064,380, filed Jul. 8, 2002 now U.S. Pat. No. 7,737,821.

BACKGROUND OF INVENTION

This invention relates to cooperative identification systems (which had their electronic beginnings in World War II as Identification—Friend or Foe Systems) in which the identifying agency and the object to be identified cooperate in the identification process according to a prearranged scheme. More specifically, the invention relates to systems consisting generically of an interrogator (or "reader") inductively coupled to a transponder (or "tag") where the reader is associated with the identifying agency and the tag is associated with the object to be identified.

Such systems are being used or have the potential of being used for identifying fish, birds, animals, or inanimate objects such as credit cards. Some of the more interesting applications involve objects of small size which means that the transponder must be minute. In many cases it is desirable to permanently attach the tag to the object which means implantation of the device in the tissues of living things and somewhere beneath the surfaces of inanimate objects. In most cases, implantation of the tag within the object forecloses the use of conventional power sources for powering the tag. Sunlight will usually not penetrate the surface of the object. Chemical sources such as batteries wear out and cannot easily be replaced. Radioactive sources might present unacceptable risks to the object subject to identification. One approach to powering the tag that has been successfully practiced for many years is to supply the tag with power from the reader by means of an alternating magnetic field generated by the reader. This approach results in a small, highly-reliable tag of indefinite life and is currently the approach of choice.

For many applications, convenience and utility dictate that the reader be hand portable which translates into the use of batteries to power the unit. However, the size and weight of batteries having the requisite capacity to perform the identification function at reasonable ranges without interruption challenge the very concept of hand-portability. The twin goals of ease of use and system performance have been the subject of uneasy compromise in the past. There is a need to harness the recent advances in technology to the design of energy efficient systems in order to realize the full potential of identification systems based on inductive coupling.

As identification systems of this type proliferate and users multiply, it becomes important to recognize this changing environment in the design of next-generation identification apparatus. Newer-model readers should be able to read older-model tags. Users' privacy and security interests must be respected—one user should not be able to read another user's tags. And finally, in this computer-driven world, it must be possible to conveniently interface readers with computers.

BRIEF SUMMARY OF INVENTION

The electronic identification system with improved sensitivity provides two-way communication between reader and tag by a one-step or two-step modulation process in which the information to be communicated either modulates an alternating magnetic field directly or modulates a periodic signal which modulates an alternating magnetic field.

Generally, in order to obtain the highest possible communication sensitivity, the coil and capacitor in both reader and tag are maintained at or near a state of resonance while communications are taking place by adjusting either intermittently or continually the frequency of the coil driving signal, the inductance of the coil, or the capacitance of the capacitor in the reader and the inductance of the coil or the capacitance of the capacitor in the tag. It may be desirable in certain situations, in order to realize the best communication performance, to maintain the coil and capacitor near resonance but not in a state of resonance.

In order to maximize the alternating magnetic field produced by the reader coil, the driving signal is tailored to the characteristics of the resonant circuit so that the highest possible coil current is achieved. In this regard, the coil is driven push-pull by means of high-power field-effect transistors connected in a bridge arrangement. Highly effective impedance matching is achieved by transformer coupling of the coil and the driver and capacitors.

Transformer coupling of the tag coil to the other devices and circuits in the tag is used in order to satisfy the diverse matching requirements imposed by these other devices and circuits.

The system utilizes maximum-likelihood procedures for identifying the bits represented by the signals transmitted by reader and tag. The maximum-likelihood procedures requires a precise knowledge of the beginning and ending of each bit period which is accomplished by a bit-timing clock signal which originates in a reader and is communicated by the reader to each tag with which it communicates. Both the reader and the tag utilize this common bit-timing clock signal for timing their bit transmissions.

DESCRIPTION OF THE PREFERRED EMBODIMENT

Figure 1:
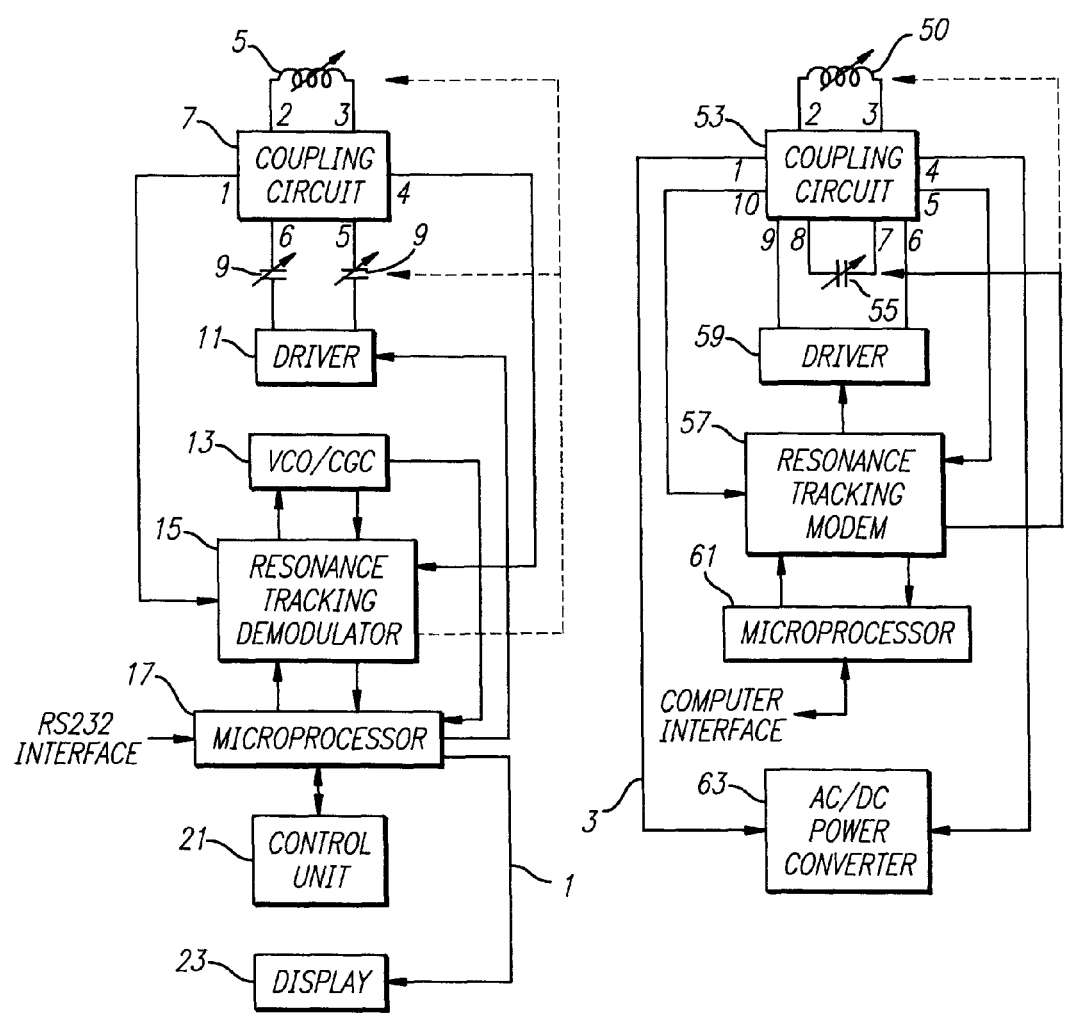
FIG. 1 is the block diagram of the identification reader and tag.

The functional block diagram for the preferred embodiment of the electronic identification system with improved sensitivity is shown in FIG. 1. The basis of communications between the reader 1 and the tag 3 is an alternating magnetic field established by the coil 5 of the reader. In order to maximize the magnetic field and the range of communication, the coil is connected by means of the coupling circuit 7 to capacitors 9 to form a series-resonant circuit. Two capacitors are used so as to facilitate the use of a push-pull driver 11 which supplies an alternating current to the series-resonant circuit.

The frequency of the alternating current supplied by the driver 11, typically between 100 and 400 kHz, is derived from the frequency of the signal supplied by the voltage-controlled oscillator/clock generating circuit (VCO/CGC) 13 which in turn is controlled by a signal supplied by the resonance-tracking demodulator 15. Overall control of the resonance-tracking demodulator is exercised by the microprocessor 17.

The resonance-tracking demodulator 15 performs two functions. One function is to maintain the series-resonant circuit comprising coil 5 and capacitors 9 in a state of resonance or near to a state of resonance. When the reader ages or experiences environmental changes as when the temperature changes or when the reader is moved about in search of a tag, the resonant frequency of the coil/capacitor circuit can change. If the driving frequency is fixed, the circuit may be operating in a non-optimum tuning condition thereby adversely affecting the communication range of the system.

In order to achieve improved performance, the resonance-tracking demodulator 15 maintains the coil/capacitor circuit in a resonant or near-resonant condition by either (1) adjusting the frequency of the signal supplied to the driver 11 by the VCO/CGC 13 so that the driving frequency of the coil/capacitor circuit is the same or nearly the same as the resonant frequency of the circuit or (2) adjusting the inductance of coil 5 or the capacitance of capacitors 9 (as indicated by the dashed control lines) to maintain the resonant frequency of the coil/capacitor circuit the same or nearly the same as the driving frequency.

The resonance-tracking demodulator 15 determines the state of resonance of the coil/capacitor circuit by varying either the frequency of the VCO in the VCO/CGC 13, the inductance of the coil 5, or the capacitance of the capacitors 9 and observing the amplitude and/or the phase of the signals appearing at terminals 1 and 4 of the coupling circuit 7.

The second function of the resonance-tracking demodulator 15 is to extract the amplitude or phase variations of the signal appearing across the coil 5, the extracted information being used in maintaining the coil/capacitor circuit in resonance or near resonance and in extracting the data transmitted by the tag 3 to the reader 1.

The tag 3 transmits data to the reader 1 by modulating the magnetic field produced by coil 5 in accordance with the data to be transmitted. This modulation is manifested at terminals 1 and 4 of the coupling circuit 7 and demodulation is accomplished by the resonance-tracking demodulator 15 using the signals at terminals 1 and 4 and signals supplied by the VCO/CGC 13.

A user exercises overall control of the reader 1 by means of an RS-232C interface to the microprocessor 17 or by means of a user-exercised tactile interface to the control unit 21 which interfaces with the microprocessor.

A display unit 23 driven by the microprocessor 17 provides information to the user as to the status of the system and displays the data received from a tag.

The circuit structure of the tag 3 parallels in many respects that of the reader 1. The coil 50 is coupled through the coupling circuit 53 to the capacitor 55, thereby forming a resonant circuit.

When the tag 3 is transmitting data to the reader 1, the resonance-tracking modem 57 supplies signals to the driver 59 which drives the coil/capacitor resonant circuit at the frequency of the alternating magnetic field in accordance with the data supplied to the resonance-tracking modem by the microprocessor 61.

When the tag 3 is receiving data from the reader 1, the resonance-tracking modem 57 demodulates the signals appearing at terminals 5 and 10 of the coupling circuit 53 and supplies the resulting binary signal to the microprocessor 61.

For best performance in either the transmit or receive mode, the coil/capacitor circuit in the tag should be operating at or near resonance. This condition is achieved by means of the resonance-tracking modem 57 which monitors the reader-originated signal appearing at terminals 5 and 10 of the coupling circuit 53, thereby determining the appropriate correction to be made in coil inductance or capacitor capacitance to achieve a condition of resonance.

A computer interface terminal is provided on the tag for the purpose of installing programs and data in the microprocessor 61 and testing the tag circuitry.

The AC/DC power converter 63 converts the received reader signal appearing at terminals 1 and 4 of the coupling circuit 53 to DC which is used to power all of the other active circuits in the tag 3.

Four alternative embodiments of the reader coupling circuit 7 are shown in FIGS. 2 through 5. The terminal numbers correspond to the terminal numbers shown on the coupling circuit 7 in FIG. 1.

Figure 2:
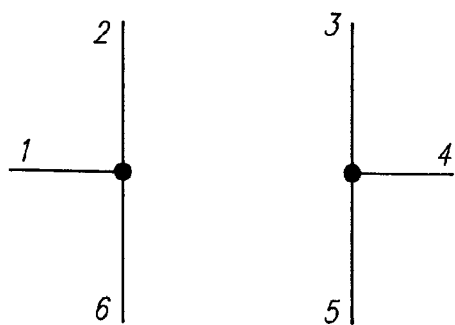
FIG. 2 is the schematic drawing of the direct-connection embodiment of the coupling means that is used in the reader.

The coupling circuit of FIG. 2 directly connects the coil 5 and the capacitors 9. The resonance-tracking demodulator 15 is connected directly across the coil 5.

Figure 3:
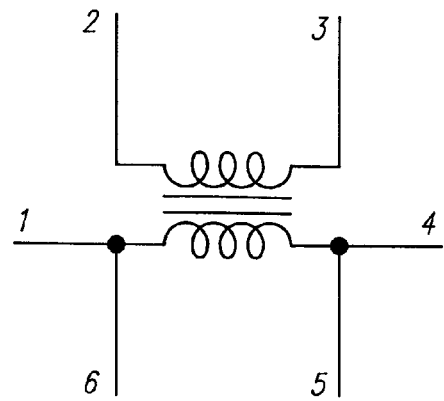
FIG. 3 is the schematic drawing of the first embodiment of the two-winding-transformer coupling means that is used in the reader.
Figure 4:
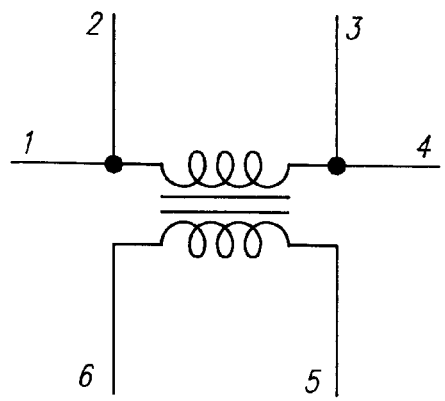
FIG. 4 is the schematic drawing of the second embodiment of the two-winding-transformer coupling means that is used in the reader.

The coupling circuits of FIGS. 3 and 4 utilize a transformer to achieve a better match between the driver 11 and the load represented by the tag 3 when the field generated by reader coil 5 couples with the tag coil 50, thereby achieving a greater transfer of power between the reader 1 and the tag 3. The resonance-tracking demodulator 15 can be connected to either the transformer primary winding (FIG. 3) or the secondary winding (FIG. 4), depending on the voltage requirement of the resonance-tracking demodulator.

Figure 5:
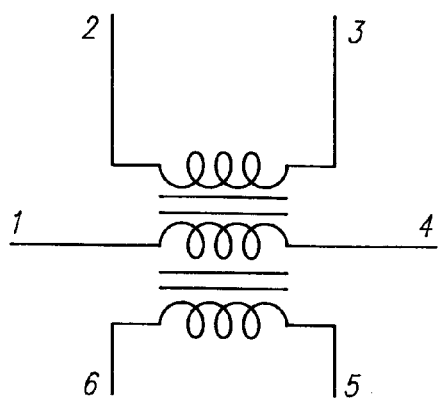
FIG. 5 is the schematic drawing of the three-winding transformer embodiment of the coupling means that is used in the reader.

The coupling circuit of FIG. 5 provides a separate winding for driving the resonance-tracking demodulator 15 thereby permitting the voltage across coil 5 to be tailored in magnitude to the needs of the device.

Figure 6:
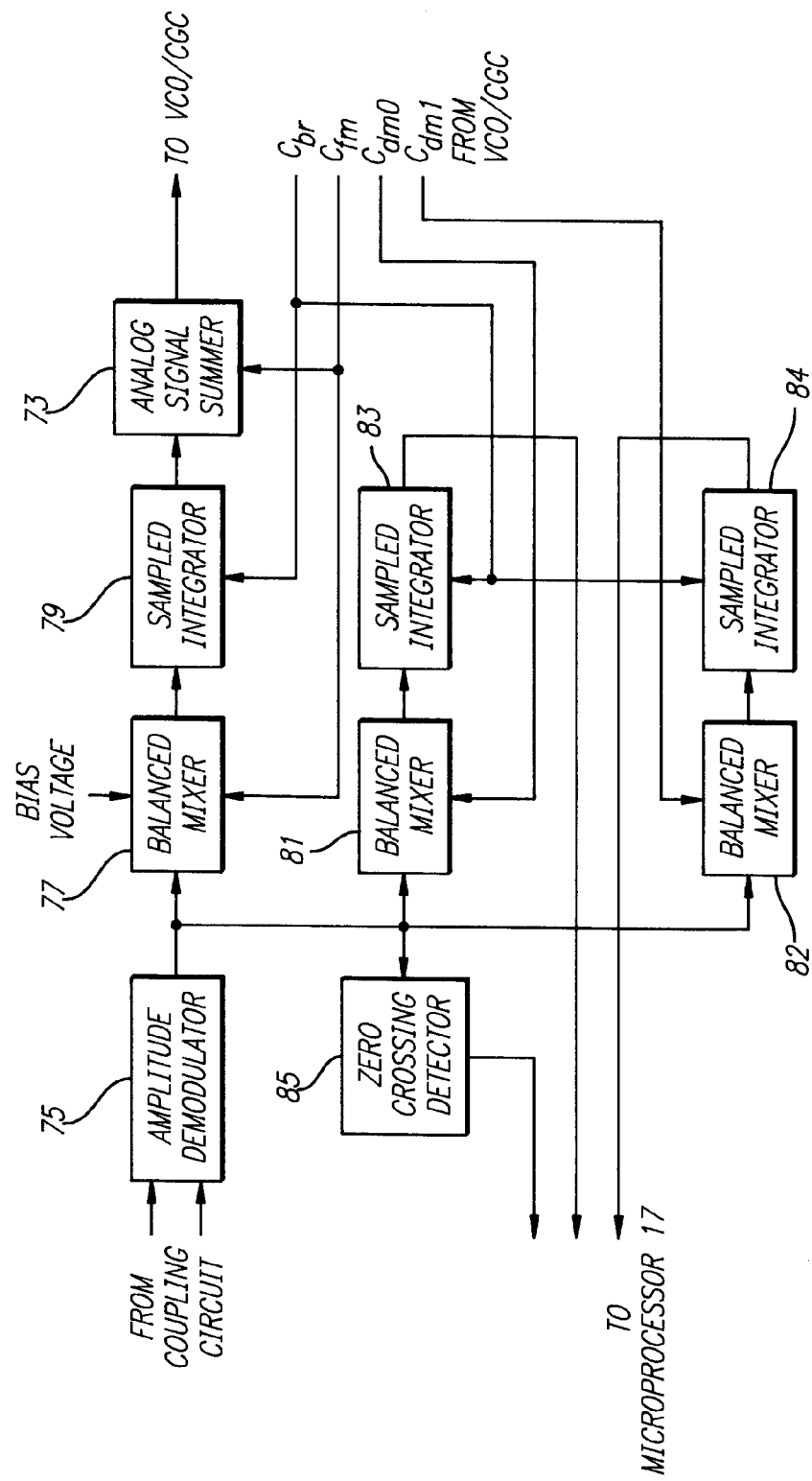
FIG. 6 is the block diagram of the first embodiment of the resonance-tracking demodulator in the reader.

An embodiment of the resonance-tracking demodulator 15 which utilizes a frequency-modulating, zero-average, square-wave signal $C_{fm}$ applied to the frequency-control terminal of the VCO/CGC 13 to discover the state of resonance of the coil/capacitor circuit 5, 7, and 9 is shown in FIG. 6. The VCO/CGC supplies $C_{fm}$ to the analog signal summer 73 which passes it through to the frequency control terminal of the VCO/CGC with the result that the frequency of the VCO alternates between two values at the modulating frequency $f_{fm}$ that is a submultiple of the frequency $f_{drive}$ of the driving signal supplied by the driver 11 to the coil/capacitor circuit 5, 7, and 9. The difference between the two VCO frequency values typically equals the VCO frequency $f_{VCO}$ divided by 2Q where Q is the Q of the coil/capacitor circuit 5, 7, and 9.

The amplitude demodulator 75 extracts a signal proportional to the amplitude of the signal appearing across coil 5, and the extracted signal is processed together with the $C_{fm}$ supplied by the VCO/CGC 13 in the balanced mixer 77 wherein the extracted signal is reversed in sign each time $C_{fm}$ takes on a particular one of its two values.

The output signal from the balanced mixer 77 is offset by the fixed bias voltage prior to being fed into the sampled integrator 79.

The sampled integrator 79 continually integrates the signal from the balanced mixer 77, samples the integration in accordance with the bit rate clock $C_{br}$ supplied by the VCO/CGC 13, and maintains each sampled integration value at its output port until the next sample is obtained. The bit rate clock $C_{br}$ has a frequency $f_{br}$ equal to the rate at which bits are transmitted between the reader 1 and a tag 3. The quantities $f_{fm}$ and $f_{br}$ are chosen such that $f_{fm}/f_{br}$ is an integer.

The output of the sampled integrator 79 is combined with $C_{fm}$ in the analog signal summer 73 and the sum signal controls the instantaneous frequency of the VCO in the VCO/CGC 13. The sampled integrator component of the output of the analog signal summer controls the average frequency of the VCO. The steady-state value of the sampled integration corresponds to the VCO control voltage for which the driver 11 frequency $f_{drive}$ is offset from the resonant frequency of the coil/capacitor circuit by an amount determined by the magnitude of the bias voltage and in a direction determined by the sign of the bias voltage.

If the resonant frequency of the coil/capacitor circuit 5, 7, and 9 changes as a result of a change in coupling of the field of reader coil 5 to tag coil 50, the sampled integration will change so as to bring about an equivalent change in the driver 11 average frequency.

In an alternative arrangement, the signal from the sampled integrator 79, instead of entering the analog signal summer 73 and controlling the frequency of the VCO in the VCO/CGC 13, maintains the coil/capacitor circuit 5, 7, and 9 in resonance by controlling either the inductance of coil 5 or the capacitance of capacitors 9. Under these circumstances, the average frequency of the VCO is continually maintained at some constant value.

In still another alternative arrangement, $C_{fm}$ modulates either the inductance of coil 5 (e.g. by means of a saturable reactor in the field of the coil) or the capacitances of capacitors 9 (e.g. by selectively connecting individual capacitors in parallel or by a plurality of voltage-controlled capacitors) instead of the frequency of the VCO.

A tag may use either phase shift keying or frequency shift keying for transmitting data to a reader. In the case of phase shift keying, the data transmitted by a tag appears as amplitude modulation of the signal from the coupling circuit 7 at a frequency $f_{dm0}$ which, like $f_{fm}$, is also a submultiple of the driving frequency $f_{drive}$. The quotient $f_{dm0}/f_{br}$, like $f_{fm}/f_{br}$, is also an integer. A bit is is identified by determining the phase of the amplitude modulation with reference to the beginning of the bit period. A "0" bit is associated with zero-phase amplitude modulation—amplitude modulation that is high for the first half-period of the modulation waveform. A "1" bit is associated with a 180-degree-phase amplitude modulation—amplitude modulation that is low for the first half-period of the modulation waveform.

In the case of frequency shift keying, the data transmitted by a tag appears as amplitude modulation of the signal from the coupling circuit 7 at a frequency $f_{dm0}$ when a "0" bit is being transmitted and at a frequency $f_{dm1}$ when a "1" bit is being transmitted. The frequencies $f_{dm0}$ and $f_{dm1}$, like $f_{fm}$, are also submultiples of the driving frequency $f_{drive}$. The quotients and $f_{dm0}/f_{br}$, like $f_{fm}/f_{br}$, are also integers. A bit is identified by determining the frequency of the amplitude modulation with reference to the beginning of the bit period. A "0" bit is associated with the frequency $f_{dm0}$ and a "1" bit is associated with the frequency $f_{dm1}$.

The determination of phase is made by multiplying in the balanced mixer 81 the signal from the amplitude demodulator 75 by a zero-phase, zero-average square wave $C_{dm0}$ of frequency $f_{dm0}$ supplied by the VCO/CGC 13 and integrating the product over each bit period in the sampled integrator 83, the integration value for each bit period being maintained at the output port of the sampled integrator until the integration for the next bit period becomes available. The beginning and ending of the integration periods are indicated by the bit rate clock $C_{br}$ since the tag transmits its bits in synchronism with the bit-rate clock $C_{br}$.

The use of frequency modulation requires two balanced mixers 81 and 82 and two sampled integrators 83 and 84. The determination of frequency is made by multiplying in the balanced mixer 81 the signal from the amplitude demodulator 75 by a zero-phase, zero-average square wave $C_{dm0}$ of frequency $f_{dm0}$ supplied by the VCO/CGC 13 and integrating the product over each bit period in the sampled integrator 83, the integration value for each bit period being maintained at the output port of the sampled integrator until the integration for the next bit period becomes available. Also, the signal from the amplitude demodulator 75 is multiplied in the balanced mixer 82 by a zero-phase, zero-average square wave $C_{dm1}$ of frequency fame supplied by the VCO/CGC 13 and integrating the product over each bit period in the sampled integrator 84, the integration value for each bit period being maintained at the output port of the sampled integrator until the integration for the next bit period becomes available. The beginning and ending of the integration periods are indicated by the bit rate clock $C_{br}$ since the tag transmits its bits in synchronism with the bit-rate clock $C_{br}$.

The clock signals $C_{dm0}$ and $C_{dm1}$ are square waves with zero average values, and consequently, a signal with frequency $f_{dm0}$ from the amplitude demodulator 75 will result in a positive value at the sampled integrator 83 output port and a zero value at the sampled integrator 84 output port. Similarly, a signal with $f_{dm1}$ from the amplitude demodulator 75 will result in a zero value at the sampled integrator 83 output port and a positive value at the sampled integrator 84 output port. Thus, the microprocessor 17 can identify a received bit from the magnitudes of the signals at the outputs of the sampled integrators 83 and 84.

The frequencies $f_{fm}$, $f_{dm0}$, and $f_{dm1}$ are chosen such that the quotients $f_{fm}/f_{br}$, $f_{dm0}/f_{br}$, and $f_{dm1}/f_{br}$ differ by an integer so that the resonance tracking process and the data extraction processes will not interfere.

There are many existing tags that utilize frequency-shift-keying for sending data to a reader and are not bit-synchronized with the reader. The zero-crossing detector 85 together with software routines in the microprocessor 17 serve to extract the data from such signals. The zero-crossing detector produces a square wave signal wherein the zero crossings coincide with those of the signal out of the amplitude demodulator 75. The software demodulation routines will be discussed later.

Figure 7:
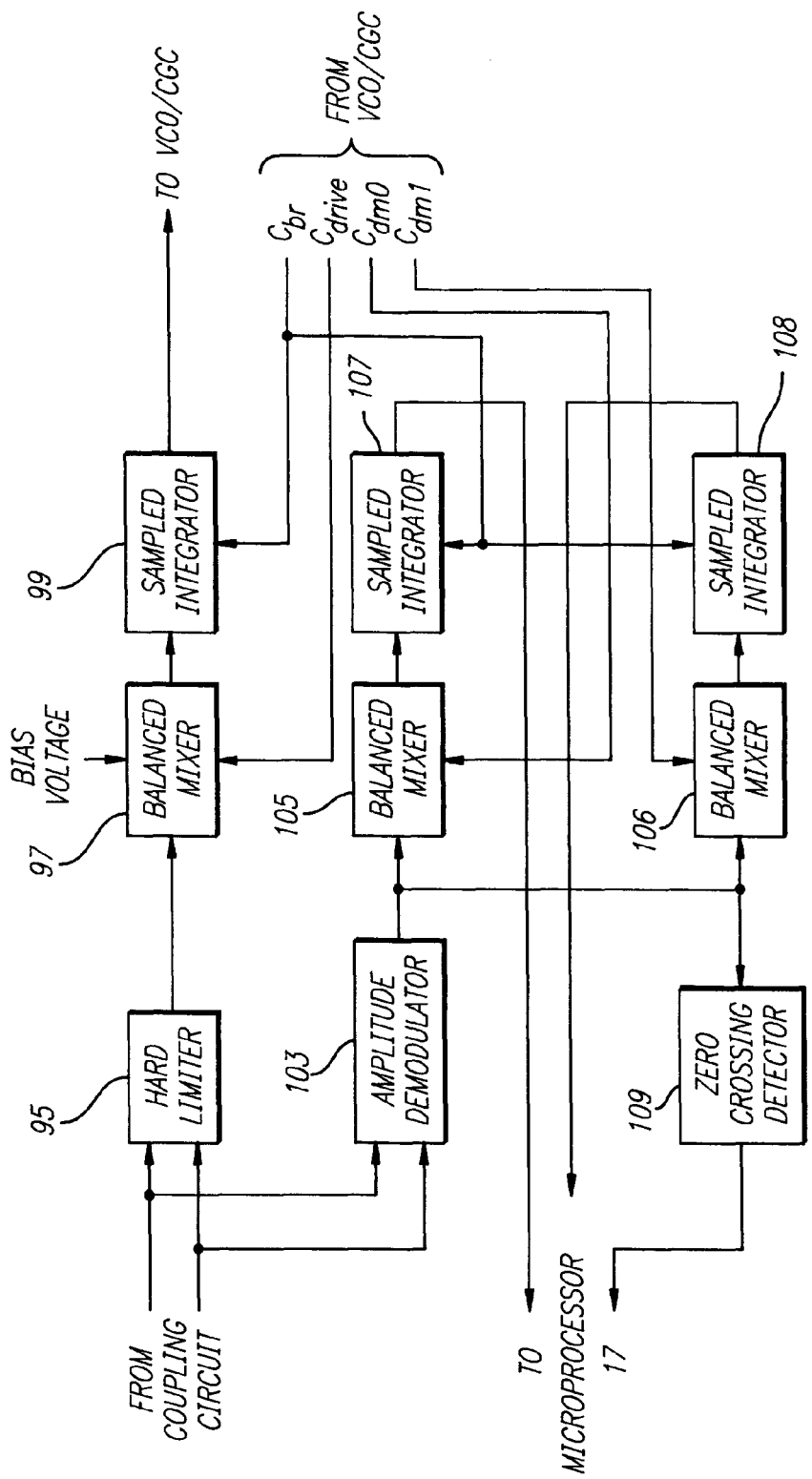
FIG. 7 is the block diagram of the second embodiment of the resonance-tracking demodulator in the reader.

An alternative embodiment of the resonance-tracking modem 15 which utilizes a phase-locked loop to maintain a state of resonance or near-resonance in the coil/capacitor circuit is shown in FIG. 7.

When the coil/capacitor circuit 5, 7, and 9 is not in resonance, the voltage across the coil 5 is approximately in phase or a half-cycle out of phase with the driving voltage from driver 11. This situation is recognized by passing the signal at terminals 1 and 4 of the coupling circuit 7 through a hard limiter 95 which removes any amplitude variations and then mixing the result with the zero-average, square-wave clock signal $C_{drive}$ having the same frequency $f_{drive}$, as and synchronized with the driving signal in the balanced mixer 97. The output of the balanced mixer is either positive or negative depending on whether the resonant frequency of the coil/capacitor circuit is above or below the driving signal frequency.

The output of the balanced mixer, offset by the bias voltage, is integrated in the sampled integrator 99 which produces at its output port a sample of the integration at intervals of the bit period and maintains each sample at its output port until a new sample becomes available. The output from the sampled integrator controls the frequency of the VCO in the VCO/CGC 13 thereby causing the VCO frequency and the driving signal frequency (which is derived from the VCO frequency) to either increase or decrease until the driving signal frequency is offset from the coil/capacitor resonant frequency by an amount determined by the magnitude of the bias voltage and in a direction determined by the sign of the bias voltage.

When the coil/capacitor circuit reaches a state of resonance or near-resonance, the coil signal is approximately a quarter-cycle out of phase with the driving signal, the output of the balanced mixer is zero, and the output of the sampled integrator remains constant until the resonant frequency of the coil/capacitor circuit changes.

Data transmitted from a tag 3 to the reader 1 is extracted from the signal appearing at terminals 1 and 4 of the coupling circuit 7 by devices 103, 105, 106, 107, 108 and 109 in exactly the same way as the same function was accomplished by devices 75, 81, 82, 83, 84, and 85 in FIG. 6.

Figure 8:
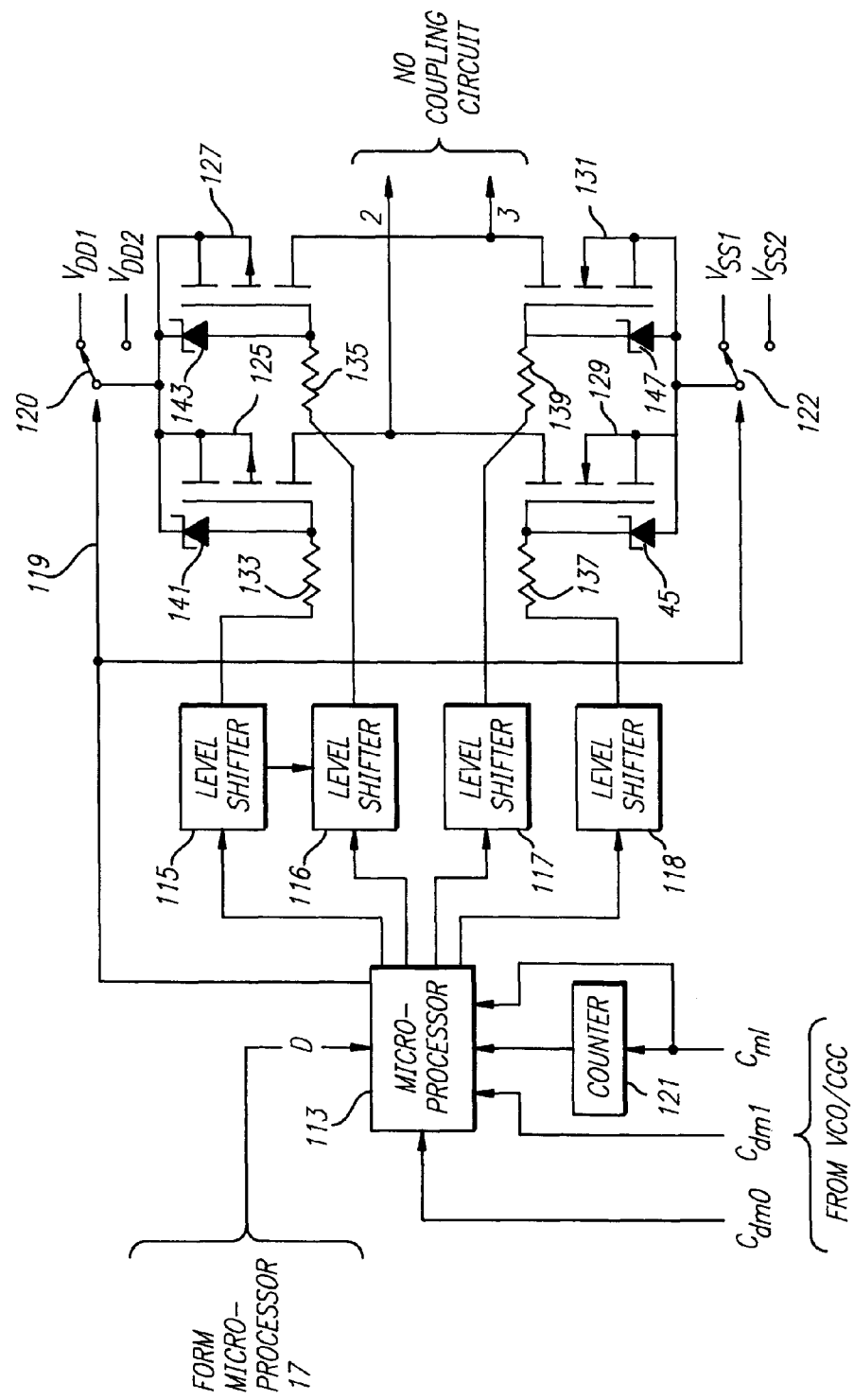
FIG. 8 is the block diagram of the preferred embodiment of the driver in the reader.

The preferred embodiment of the driver 11 is shown in FIG. 8. This embodiment utilizes the microprocessor 113, the four level shifters 115, 116, 117, and 118, and the driving circuit 119 to generate a stepped waveform. The generated waveform can be a simple two-level square wave or a more complicated three-level waveform. The preferred waveform is the three-level waveform for which regions centered on the zero crossings of a sine wave are represented by a zero level, the negative-value regions of the sine wave are represented by a negative level, and the positive-value regions of the sine wave are represented by a positive level, the absolute values of the negative and positive levels being equal.

The levels of four two-level waveforms $F_{P1}(n\Delta t)$, $F_{N1}(n\Delta t)$, $F_{P2}(n\Delta t)$, and $F_{N2}(n\Delta t)$ for one cycle are stored in the microprocessor 113 and retrieved at intervals of $\Delta t$ and supplied respectively to the level shifters 115, 116, 117, and 118 which convert the two-level input waveforms into two-level output waveforms, the levels of the two-level output waveforms being such that the associated field-effect transistors in the driving circuit 119 either conduct current or do not conduct. The waveforms with P subscripts drive the P-channel devices and the ones with N subscripts drive the N-channel devices in the driving circuit 119.

One cycle of the two-level waveforms is represented by values of n ranging from 0 to N−1 where N is a predetermined integer. Thus, $N\Delta t$ is the period of the driving signal. The clock signal $C_{m1}$ with frequency $f_{m1}$ is supplied by the VCO/CGC 13 to the microprocessor 113 and causes the microprocessor to produce levels at its output at the $f_{m1}$ rate. The frequency $f_{m1}$ divided by N equals the frequency $f_{drive}$ of the output signal of the driver 11. The address n of a level is obtained by the counter 121 counting modulo N the cycles of the clock signal $C_{m1}$.

The amplitude of the output signal of the driver 11 is governed by the microprocessor 113 in accordance with the clock signals $C_{dm0}$ and $C_{dm1}$ supplied by VCO/CGC 13 and the data bit stream D supplied by the microprocessor 17. The reader 1 can use phase shift keying, frequency shift keying, or a combination of the two in transmitting data to the tag.

Phase shift keying is accomplished in the following way. If the low and high values of the clock signals are represented by "0" and "1" respectively, then switches 120 and 122 connect $V_{DD1}$ and $V_{SS1}$ to the driving circuit 119 whenever $(C_{dm0}+D)_{modulo\ 2}=1$. Switches 120 and 122 connect $V_{DD2}$ and $V_{SS2}$ to the driving circuit 119 whenever $(C_{dm0}+D)_{modulo\ 2}=0$. Alternatively, $C_{dm1}$ could be used instead of $C_{dm0}$ in implementing phase shift keying. The difference between $V_{DD1}$ and $V_{SS1}$ is approximately 10 volts. The difference between $V_{DD2}$ and $V_{SS2}$ is approximately 12 volts.

Frequency shift keying is accomplished by driving the switches 120 and 122 with either $C_{dm0}$ or $C_{dm1}$ depending on the value of the bit to be transmitted to the tag.

Twice the communication capacity can be realized by selecting either $C_{dm0}$ or $C_{dm1}$ in accordance with a first bit stream and selecting the phase of the selected $C_{dm0}$ or $C_{dm1}$ in accordance with a second bit stream.

The driving circuit 119 consists of the two power-handling P-channel field-effect transistors 125 and 127 and the two power-handling N-channel field-effect transistors 129 and 131. If the voltages applied to the gates of transistors 125 and 131 permit the transistors to conduct current, current will flow from the $V_{DD}$ supply through transistor 125 to terminal 2 of the coupling and from terminal 3 of the coupling circuit through transistor 131 to the $V_{SS}$ supply.

Similarly, if the voltages applied to the gates of transistors 127 and 129 permit the transistors to conduct current, current will flow from the $V_{DD}$ supply through transistor 127 to terminal 3 of the coupling and from terminal 2 of the coupling circuit through transistor 129 to the $V_{SS}$ supply.

Since the transistors 125, 127, 129, and 131 are all individually controlled, each transistor may be on or off at any particular time.

Field-effect transistors 125, 127, 129, and 131 can be all N-channel devices which are smaller, less expensive, have lower "on" resistance, and are more plentiful on the market than P-channel devices. In order to accommodate the N-channel devices, the gates would be coupled to level shifters 115, 116, 117, and 118 by transformers. It is possible to generate less sophisticated driving signals with a single transformer having one primary winding and four secondary windings, one for each transistor gate. One level shifter would be used to drive the primary winding of the transformer.

A class of driving signals can be generated where the waveforms supplied by the microprocessor 113 to level shifters 116 and 117 are simply inverted versions of the waveforms supplied to level shifters 115 and 118 respectively. In fact, there are many possible alternatives for generating the signals to be applied to the gates of field-effect transistors 125, 127, 129, and 131 and achieve the objectives of the present invention.

The resistors 133, 135, 137, and 139 prevent ringing in the gate circuits on turn-on of the transistors and slow down the turn-on time. The diodes 141, 143, 145, and 147 protect the gates of the power-handling field-effect transistors from voltage spikes which could cause progressive gate damage and eventual failure.

Figure 9:
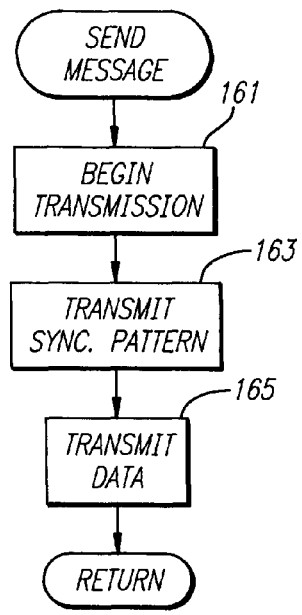
FIG. 9 is the flow diagram of the preferred embodiment of the subroutine that controls the operations of the microprocessor in the reader when the reader is sending a message to the tag.

The microprocessor 17 is a commercially-available microprocessor having a performance level equal to or greater than an 80051 or 87C51. Data and/or commands are entered into the microprocessor by means of a keyboard or switches in the control unit 21 or by means of a RS-232C interface with the microprocessor. A message entered for transmission to a tag is stored in the microprocessor memory. When a command to "send message" is entered, the subroutine shown in FIG. 9 is performed by the microprocessor.

In the absence of commands from microprocessor 17, the microprocessor 113 in the driver 11, provides inputs to the level shifters 115, 116, 117, and 118 that result in voltages at their output ports that prevent any current from flowing through terminals 2 and 3 of the coupling circuit 7. The microprocessor 17, upon receiving the "send message" command, performs step 161 in FIG. 9 thereby causing the microprocessor 113 in the driver 11 to clear the counter 121 and then to generate the two- or three-level waveforms. The microprocessor 17 transmits a synchronization pattern consisting of alternating "0's" and "1's" during step 163 for a period of time sufficient for the tag to achieve bit synchronization. Then, in step 165, the microprocessor 17 starts sending the message data D stored in memory to the microprocessor 113 in the driver 11. The microprocessor 17 continually performs the "send message" program for as long as the "send message" command is entered into the microprocessor by the user. The microprocessor 17 shuts the driver down after the message transmission has been completed if the "send message" command no longer appears at the input port of the microprocessor.

Tag synchronization and validation, as described in the material that follows, permits tag data to be received that may contain embedded sync patterns. This capability is important in that it allows the full tag data space to be utilized for the transmission of arbitrary data. Without this capability, other means would have to be used such as bit stuffing or sync filtering to remove sync patterns from the transmitted tag data. Such processes are undesirable in that they restrict the possible tag data space or impose a high penalty in the number of bits available for the transmission of data.

Figure 10:
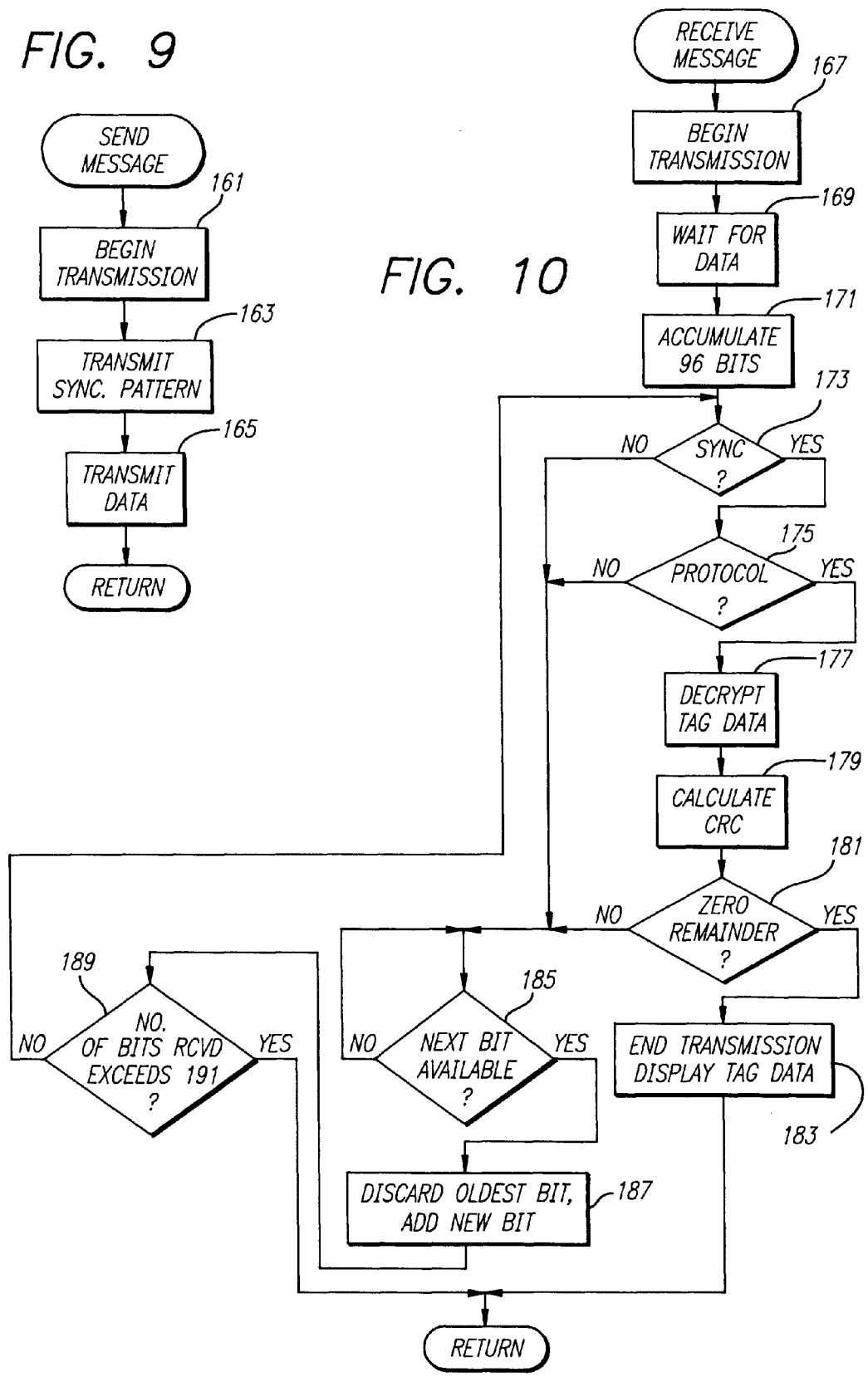
FIG. 10 is the flow diagram of the first embodiment of the subroutine that controls the operations of the microprocessor in the reader when the reader is receiving a message from the tag.
Figure 11:
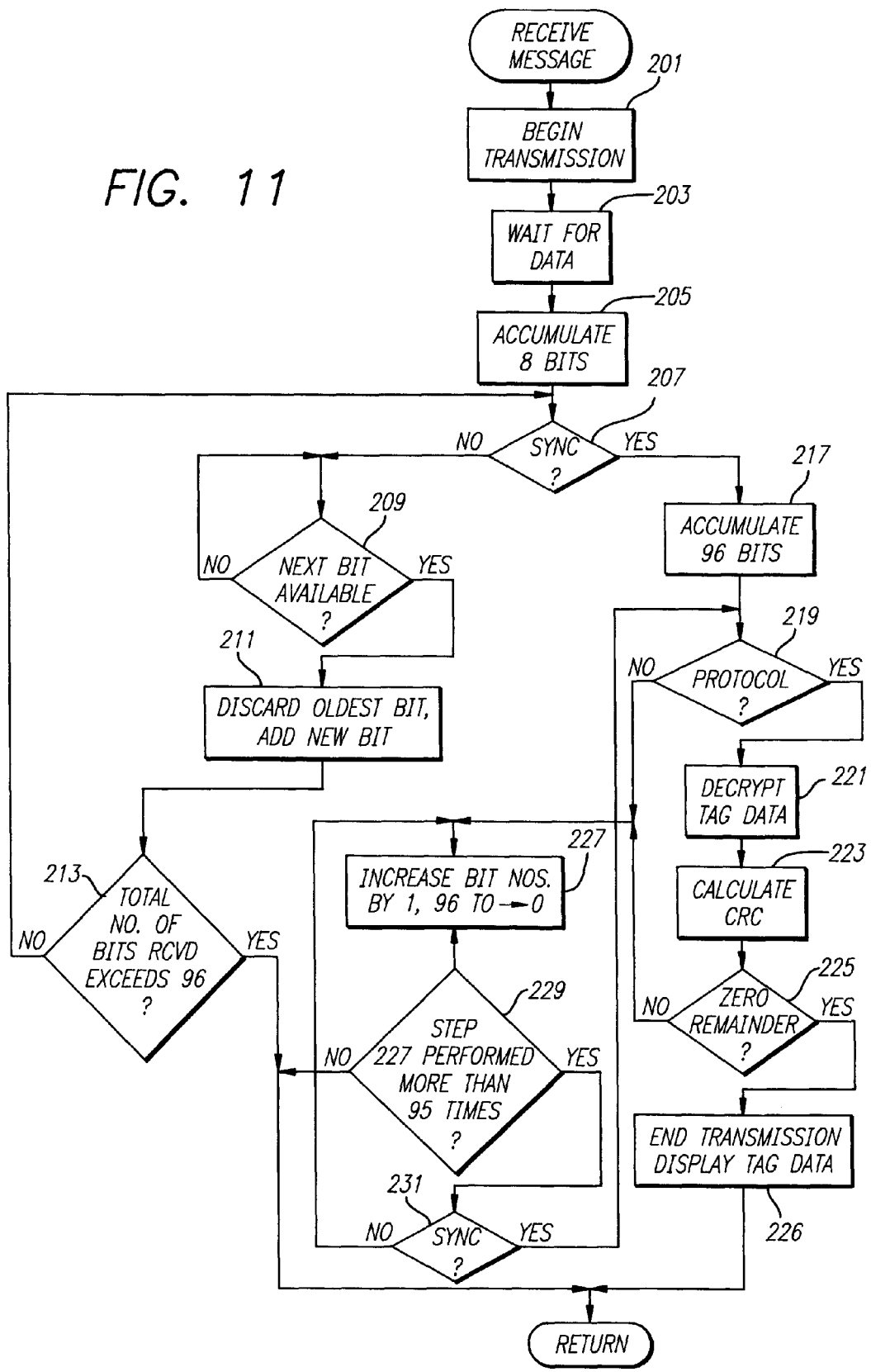
FIG. 11 is the flow diagram of the second embodiment of the subroutine that controls the operations of the microprocessor in the reader when the reader is receiving a message from the tag.

When the "receive message" command is entered into the microprocessor 17 by the user, the microprocessor performs the operations indicated either in FIG. 10 or FIG. 11.

The process of FIG. 10 begins with step 167 where the microprocessor 17 activates the driver 11 and establishes an alternating magnetic field by means of coil 5 and transmits the bit synchronization pattern for a period of time sufficient for the tag to achieve bit synchronization. The tag 3, if it determines that the alternating magnetic field carries no data after the transmission of the bit synchronization pattern ceases, repeatedly transmits a 96-bit message stored in the microprocessor 61 memory until the alternating magnetic field is no longer generated by the reader 1. The 96 bits are comprised of a 2-bit preamble (01), an 8-bit synchronization sequence (01111110), a 6-bit protocol, and an 80-bit encrypted version of 64 bits of tag data and a 16-bit checksum for the tag data that allows error detection by the reader. The protocol word identifies the process to be used in converting the 80-bit encrypted tag data-and-checksum sequence into meaningful tag data. The checksum is determined in accordance with the CCITT V.41 code-independent error-control system.

The microprocessor 17 waits in step 169 for a 01 combination (which may or may not be the 2-bit preamble) to be received from the sampled integrator 83 in the resonance-tracking modem 15, indicating that bit synchronization has been achieved by the tag and that data is being received. Then, in step 171, the microprocessor 17 accumulates another 94 bits, for a total of 96 bits including the initial 01 combination, (numbered from 0 to 95 according to order of arrival) and stores them in memory.

In step 173, bits 2-9 are compared with the synchronization sequence. If there is a match, bits 10-15 are compared with the protocol sequence in step 175. If there is a match, the 80-bit tag data sequence is decrypted in step 177 and a cyclic redundancy check (CRC) is made in step 179 by dividing the polynomial $D_{79}X^{79}+D_{78}X^{78}+D_{77}X^{77}+\ldots+D_0X^0$ by the generating polynomial $X^{16}+X^{12}X^5+1$. If there is a zero remainder, the CRC indicates an absence of errors, in which case the microprocessor 17 terminates the generation of the alternating magnetic field and causes the tag data to be displayed on display 23.

If the results of any of the steps 173, 175, and 181 is negative, then the microprocessor 17 waits in step 185 for the next bit to be determined by the phase-shift-keying demodulator comprising the balanced mixer 81 and the sampled integrator 83 or the frequency-shift-keying demodulator comprising the balanced mixers 81 and 82 and the sampled integrators 83 and 84, assigns this bit the number 96, discards the bit numbered 0, and reduces the numbers of all of the remaining bits by 1. The microprocessor then repeats the steps beginning with step 173 unless the number of bits received exceeds 192 (step 189) in which case the microprocessor returns to the beginning of the program.

The alternative process shown in FIG. 11 is more complex than the one shown in FIG. 10 but is less demanding insofar as real-time processing is concerned. The process begins with step 201 where the microprocessor 17 activates the driver 11 and establishes an alternating magnetic field by means of coil 5.

The microprocessor 17 waits in step 203 for a 01 combination to be received from the sampled integrator 83 in the resonance-tracking modem 15, indicating that bit synchronization has been achieved by the tag and that data is being received. Then, in step 205, the microprocessor 17 accumulates the next 8 bits (numbered from 0 to 7) and compares them in step 207 with the synchronization sequence. If there is not a match, the microprocessor waits in step 209 for the next bit to become available. In step 211, the bit numbers are increased by 1, the oldest bit (numbered 8) is discarded, the newest bit is added and assigned the number 0, and the process beginning with step 207 is repeated unless the total number of bits received exceeds 96 (step 213) in which case the microprocessor returns to the beginning of the program.

If at step 207 there is a match between bits 0-7 and the synchronization sequence, then an additional 88 bits, numbered from 8 to 95, is accumulated in step 217. Bits 8-13 are compared with the protocol sequence in step 219. If there is a match, the following 80 bits are decrypted in step 221, and the cyclic redundancy check is made in step 223. If the remainder is zero (indicating no errors), the microprocessor terminates the generation of the alternating magnetic field and causes the tag data to appear on display 23.

If either of the steps 219 or 225 give negative results, then in step 227 the numbers associated with the 96 bits being processed are increased by 1 except for the bit numbered 95 which is renumbered 0. If the total number of passes through step 227 is less than 96 (step 229), bits 0-7 are compared with the synchronization sequence in step 231, and if there is a match, the process is repeated beginning with step 219.

If at step 229 the total number of passes through step 227 is not less than 96, then the microprocessor returns to the beginning of the program.

The preferred embodiment of the coupling circuit 53 in the tag 3 depends on the characteristics of the components to which it connects, the need for achieving the greatest possible transfer of power from the source to the sinks, and the sensitivity of tag customers to the costs of tags and readers.

Figure 12:
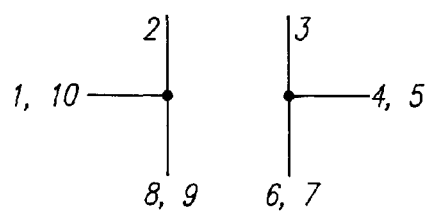
FIG. 12 is the schematic drawing of the direct-connection embodiment of the coupling means that is used in the tag.

The simplest embodiment is shown in FIG. 12 where all terminals shown at the left of the coupling circuit 53 in FIG. 1 are connected together and all terminals at the right are connected together. There are few means of optimization with this arrangement and communication range between reader and tag is likely to be sacrificed as a result. On the other hand, it is the least costly embodiment of the coil/coupling circuit/capacitor circuit 50, 53, and 55.

Figure 13:
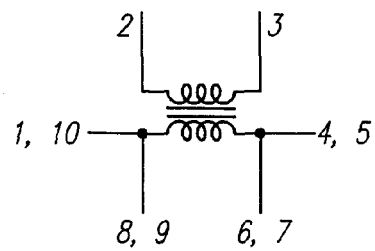
FIG. 13 is the schematic drawing of the first embodiment of the two-winding-transformer coupling means that is used in the tag.
Figure 14:
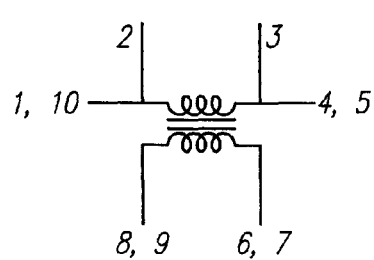
FIG. 14 is the schematic drawing of the second embodiment of the two-winding-transformer coupling means that is used in the tag.

The embodiments shown in FIGS. 13 and 14 provide a means of improving the power transfer efficiency between reader and tag by utilizing the impedance transforming characteristics of a transformer. In addition, the impedance transforming properties of a transformer allows a greater latitude in designing the coil 50 and selecting the capacitor 55.

Figure 15:
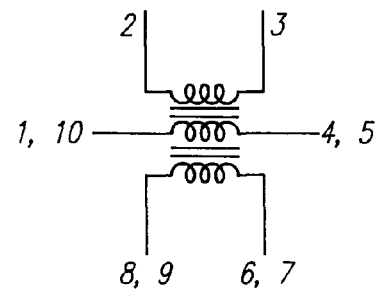
FIG. 15 is the schematic drawing of the three-winding transformer embodiment of the coupling means that is used in the tag.

Adding a third winding to the transformer, as shown in FIG. 15 provides additional opportunities for optimization of the coil/coupling circuit/capacitor circuit 50, 53, and 55. It is still necessary with this circuit for the resonance-tracking modem 57 and the AC/DC power converter 63 to share a transformer winding and similarly for the capacitor 55 and the driver 59.

Figure 16:
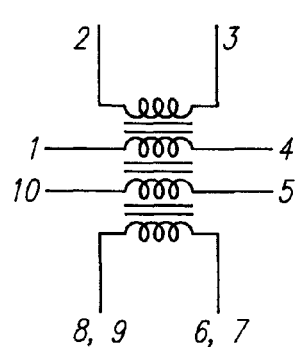
FIG. 16 is the schematic drawing of the four-winding transformer embodiment of the coupling means that is used in the tag.

Adding a fourth winding to the transformer, as shown in FIG. 16, permits the disparate requirements of the resonance tracking modem 57 and the AC/DC power converter 63 to be satisfied.

Figure 17:
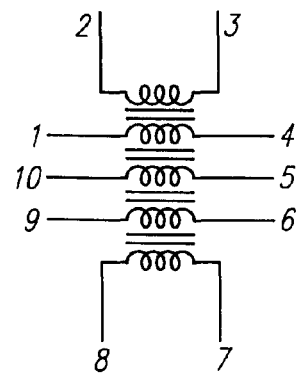
FIG. 17 is the schematic drawing of the five-winding transformer embodiment of the coupling means that is used in the tag.

Finally, adding a fifth winding to the transformer, as shown in FIG. 17, allows each device drawing power from the coil 50 to have its own individual winding tailored to its own needs.

The choice of an embodiment of the coupling circuit 53 is made on the basis of availability of components, performance requirements imposed by the application, and cost. The design of multi-winding transformers for the purpose of optimizing power transfer or achieving other goals is well understood by those knowledgeable in the art.

The resonance-tracking modem 57 performs three functions. It extracts the data transmitted by the reader 1 from the signal appearing on the coil 50 and supplies this data to the microprocessor 61. It accepts data from the microprocessor for transmission to the reader and generates appropriate waveforms for this purpose that are supplied to the driver 59. And it maintains the coil/coupling circuit/capacitor combination 50, 53, and 55 in resonance or near resonance.

Figure 18B:
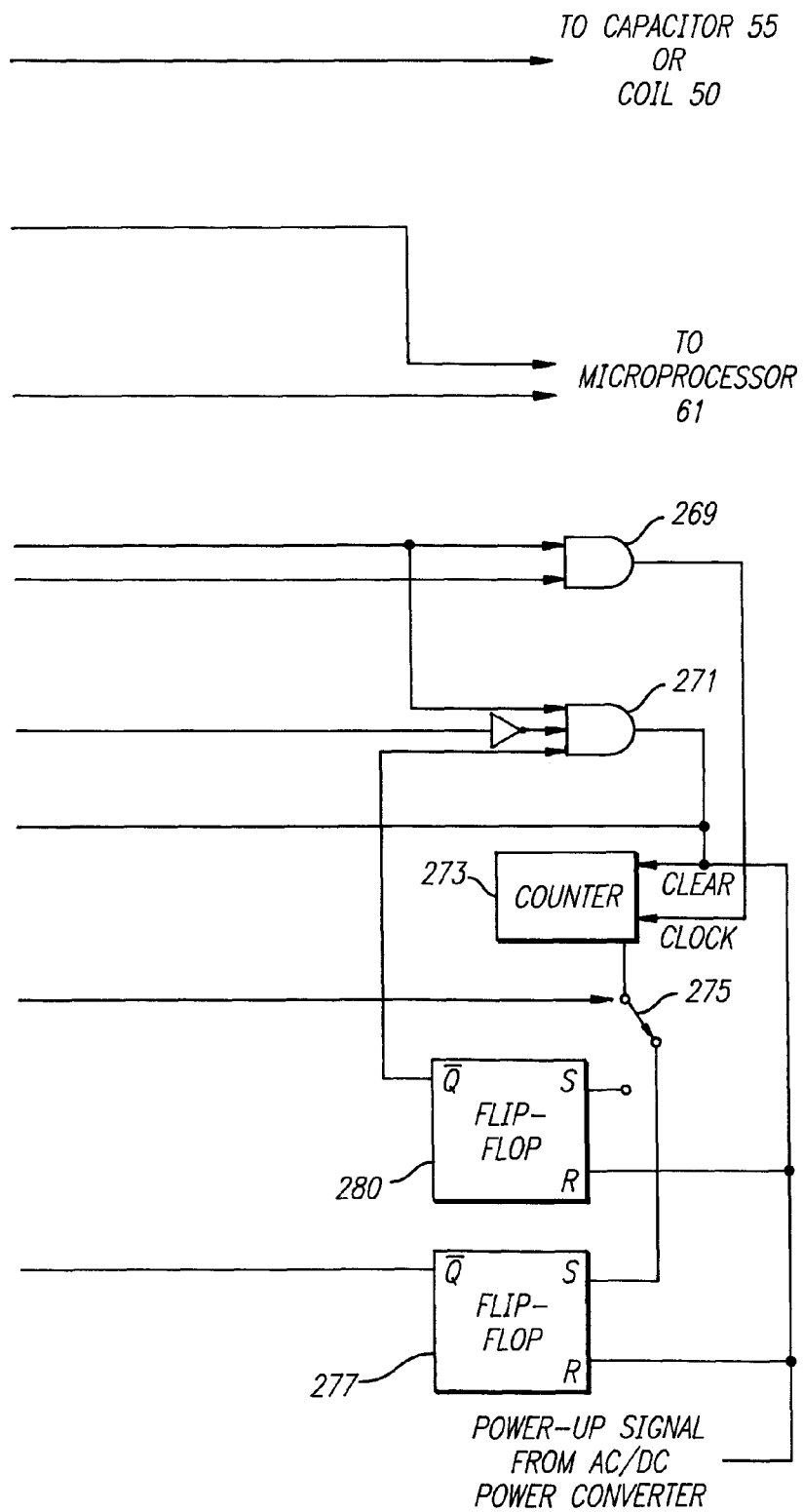
FIG. 18 is the block diagram of the preferred embodiment of the resonance-tracking modem in the tag.

The preferred embodiment of the resonance-tracking modem 57 is shown in FIG. 18. The signal appearing on terminals 5 and 10 of the coupling circuit 53 enters the amplitude demodulator 251, frequency divider 253, frequency divider 255, and frequency divider 285. The amplitude demodulator removes the amplitude modulation from the arriving signal, blocks the DC component, and feeds the resulting DC-blocked amplitude modulation into the two balanced mixers 257 and 259.

The frequency divider 253 generates a DC-blocked square wave signal of frequency $f_{fm}$ by dividing down the input signal which has the frequency $f_{drive}$. This square wave is synchronized with the amplitude modulation from amplitude demodulator 251 as a result of the signals introduced at the bottom of the frequency divider 253 block.

The square wave produced by the frequency divider 253 constitutes the second input to the balanced mixer 257 and causes the DC-blocked amplitude modulation to be reversed in sign whenever the square wave is negative. The output of the balanced mixer 257, offset by the bias voltage, enters the sampled integrator 261 which continually integrates the incoming signal and provides at its output port the value of the integration at intervals of the bit period. Bit synchronizing signals are introduced at the bottom of the sampled integrator 261 block.

The sampled integrator 261 maintains the most recent integration value at its output terminal until a new integration value is determined. The output of the sampled integrator controls the capacitance of capacitor 55 or, alternatively, the inductance of coil 50, the capacitance or the inductance, as the case may be, being a monotonically increasing or decreasing function of the control signal magnitude.

If the capacitor 55 comprises a plurality of capacitors selectively connected in parallel to obtain a desired capacitance value, then the output of the sampled integrator 261 is converted to a plurality of binary signals, each of which controls a switch associated with each of the plurality of capacitors that may be connected into a parallel configuration. The values of the individual capacitors are so chosen and the switching signals are so designed that the total capacitance of the capacitors connected in parallel is an increasing or decreasing function of the output of the sampled integrator.

The operations performed by the balanced mixer 257 and the sampled integrator 261 result in a change in the integration quantity over a bit period of $KA/f_{br}$ where K is a positive constant, A is the value (a positive or negative number) of the DC-blocked amplitude modulation when the DC-blocked square wave from the frequency divider 253 is positive, and $f_{br}$ is the bit rate.

When the reader 1 initiates a transmission, it frequency modulates the driving signal at a frequency of $f_{fm}$ which also results in an $f_{fm}$ component in the amplitude modulation if the coil 5, coupling circuit 7, and capacitors 9 in the reader are not in resonance. However, the resonance-tracking demodulator 15 in the reader quickly adjusts the driving frequency to match the resonant frequency of the circuit and by the time the tag 3 is powered up and ready to operate there is essentially no $f_{fm}$ component in the amplitude modulation of the alternating magnetic field produced by the reader coil 5.

If the coil 50, coupling circuit 53, and capacitor 55 in the tag 3 are not in resonance, the square-wave modulation of the driving frequency by the reader will cause an $f_{fm}$ component to appear in the amplitude modulation of the signal appearing across terminals 5 and 10 of the coupling circuit 53. As a result, the output from the sampled integrator 261 will increase if A is positive and decrease if A is negative, thereby causing the capacitance of capacitor 55 or the inductance of coil 50 to change in a way that brings the coil 50, coupling circuit 53, and capacitor 55 into resonance or near to resonance, depending upon the value of the bias voltage applied to the balanced mixer 257. At steady-state, the $f_{fm}$ component appearing in the amplitude modulation of the signal across terminals 5 and 10 of the coupling circuit 53 equals the bias voltage and the output from the sampled integrator no longer increases or decreases.

If the coil, coupling circuit, and capacitor start to drift out of resonance or from the chosen point of near-resonance, the $f_{fm}$ component in the amplitude modulation changes, and the sampled integrator automatically changes the capacitance or inductance to bring the circuit back into resonance or to the desired point of near-resonance.

When the reader 1 initiates a transmission, it also begins modulating the alternating magnetic field in amplitude with the square wave of frequency $f_{dm0}$ and shifting the phase by 180 degrees at the beginning of each bit period. The amplitude modulation resulting from the $f_{dm0}$ signal is greater than the amplitude modulation resulting from the frequency modulation by a factor of at least two or three.

The output signal from the amplitude demodulator 251 passes through switch 262 and enters pulse generator 263. Each time the signal crosses the zero axis, the pulse generator 263 generates a pulse having a duration equal to about $\frac{1}{2}f_{dm0}$. The DC-blocked square wave of frequency $f_{dm0}$ from frequency divider 255 passes through switch 265 and enters pulse generator 267. The pulse generator 267 generates a pulse having a duration equal to about $\frac{1}{2}f_{dm0}$ for each negative-to-positive transition of the square wave from frequency divider 255.

The pulses from pulse generators 263 and 267 are ANDed in AND gate 269 and the pulse from pulse generator 263 and the inverse of the pulse from pulse generator 267 are ANDed in AND gate 271. An uninterrupted succession of coincident pulses from the two pulse generators cause the counter 273 to count up to four at which point the counter produces a signal which passes through switch 275 and sets the flip-flop 277 causing the Qbar output of the flip-flop to go to zero and the switches 262, 265, 275, and 279 to connect to the other terminals. The counter output provides reasonable assurance that the square wave of frequency $f_{dm0}$ produced by frequency divider 255 is in synchronism with the square-wave clock signal of frequency faro generated in the reader 1.

If, however, a pulse produced by pulse generator 263 is not accompanied by a pulse from pulse generator 267, a pulse is produced by AND gate 271 since the flip-flop 280 is reset when a tag 3 is first activated and Qbar remains equal to 1 until the counter 273 sets the flip-flop. The output pulse from the AND gate 271 clears the counter of any counts that have been accumulated and also passes through switch 279 and clears the frequency divider 255 so that the next pulse generated by the pulse generator 267 should coincide with the next pulse generated by the pulse generator 263 and result in $f_{dm0}$ synchronization.

The frequency divider 255 generates a DC-blocked square wave of frequency $f_{dm0}$ from the incoming signal and this square wave causes the DC-blocked amplitude modulation extracted by amplitude demodulator 251 from the incoming signal to be reversed in sign in balanced mixer 259 whenever the DC-blocked square wave is negative. The result is a square wave signal at the output port of the balanced mixer 259 which crosses the zero axis at the bit rate $f_{br}$.

The square wave signal from the balanced mixer 259 passes through switch 262 and enters pulse generator 263 after $f_{dm0}$ synchronization has been achieved. Each time the square wave from the balanced mixer 259 crosses the zero axis, the pulse generator 263 generates a pulse having a duration equal to about $\frac{1}{2}f_{dm}$.

The DC-blocked square wave of frequency $f_{dm}$ from frequency divider 255 is further divided in frequency divider 281 to give a square wave of frequency $f_{br}$. The $f_{br}$ square wave passes through switch 265 and enters pulse generator 267 which generates a pulse having a duration equal to about $\frac{1}{2}f_{dm0}$ for each negative-to-positive transition of the square wave from frequency divider 281.

The pulses from pulse generators 263 and 267 are ANDed in AND gate 269 and the pulse from pulse generator 263 and the inverse of the pulse from pulse generator 267 are ANDed in AND gate 271. An uninterrupted succession of coincident pulses from the two pulse generators cause the counter 273 to count up to four at which point the counter produces a signal which passes through switch 275 and sets the flip-flop 280 causing the Qbar output of the flip-flop to go to zero. The counter output provides reasonable assurance that the square wave of frequency $f_{br}$ produced by frequency divider 281 is in synchronism with the square-wave clock signal of frequency $f_{br}$ generated in the reader 1. In other words, an output from counter 273 indicates bit synchronization between the reader 1 and a tag 3.

If, however, a pulse produced by pulse generator 263 is not accompanied by a pulse from pulse generator 267, a pulse is produced by AND gate 271 since the flip-flop 280 is reset when a tag 3 is first activated and Qbar remains equal to 1 until the counter 273 sets the flip-flop. The output pulse from the AND gate 271 clears the counter of any counts that have been accumulated and also passes through switch 279 and clears the frequency divider 281 so that the next pulse generated by the pulse generator 267 should coincide with the next pulse generated by the pulse generator 263 and result in bit synchronization.

The pulses that clear frequency divider 281 also clear frequency divider 253. As a result, the last pulse that clears frequency divider 281 and brings about bit synchronization also brings about $f_{fm}$ synchronization by clearing frequency divider 253.

The pulses that clear frequency divider 281 also clear the frequency divider 285 which generates a DC-blocked square wave of frequency $f_{dm1}$ from the incoming signal that is synchronized with the $f_{dm1}$ signal in the reader 1. This square wave causes the DC-blocked amplitude modulation extracted by amplitude demodulator 251 from the incoming signal to be reversed in sign in balanced mixer 260 whenever the DC-blocked square wave is negative.

After allowing time for a tag 3 to achieve bit synchronization, the reader 1 begins sending data. The incoming bits are identified by means of the balanced mixers 259 and 260 and the sampled integrators 282 and 284 in the same way as the similar task was accomplished in the reader with balanced mixers 81 and 82 and sampled integrators 83 and 84 (see FIG. 6).

The pulses from pulse generator 267 are used by the sampled integrator 261 as indices of the beginnings and endings of the integration periods before bit synchronization is achieved.

After bit synchronization is achieved and data is not being transmitted by the reader 1, a tag 3 transmits data to the reader. The data is stored in the microprocessor 61 and supplied to the resonance-tracking modem 57 in accordance with the bit rate clock signal generated by frequency divider 281.

The microprocessor 61 can be programmed to use either phase shift keying, frequency shift keying, or a combination of the two. Phase shift keying is accomplished by maintaining switch 287 in the position shown in FIG. 18 and the phase of the $f_{dm0}$ signal from the frequency divider 255 is shifted in phase by 0 or 180 degrees by balanced modulator 283 depending on whether the bit supplied by microprocessor 61 is a "0" or "1" respectively. The signal out of switch 287 provides the input to the driver 59.

Frequency shift keying is accomplished by maintaining the microprocessor 61 inputs to the balanced modulators 283 and 289 at positive levels and changing the position of switch 285 in accordance with the bit value to be transmitted.

Twice the communication capacity can be realized by utilizing phase shift keying and frequency shift keying simultaneously by supplying a first bit stream to the balanced modulators 283 and 289 and a second bit stream to the switch 287.

It was mentioned earlier that a means is provided in the reader 1 of FIG. 1 for demodulating the frequency-shift-keyed (FSK) signals that are produced by many existing tags. The demodulation process is accomplished by the microprocessor 17 in accordance with the routines shown in FIGS. 19 and 20.

Figure 19:
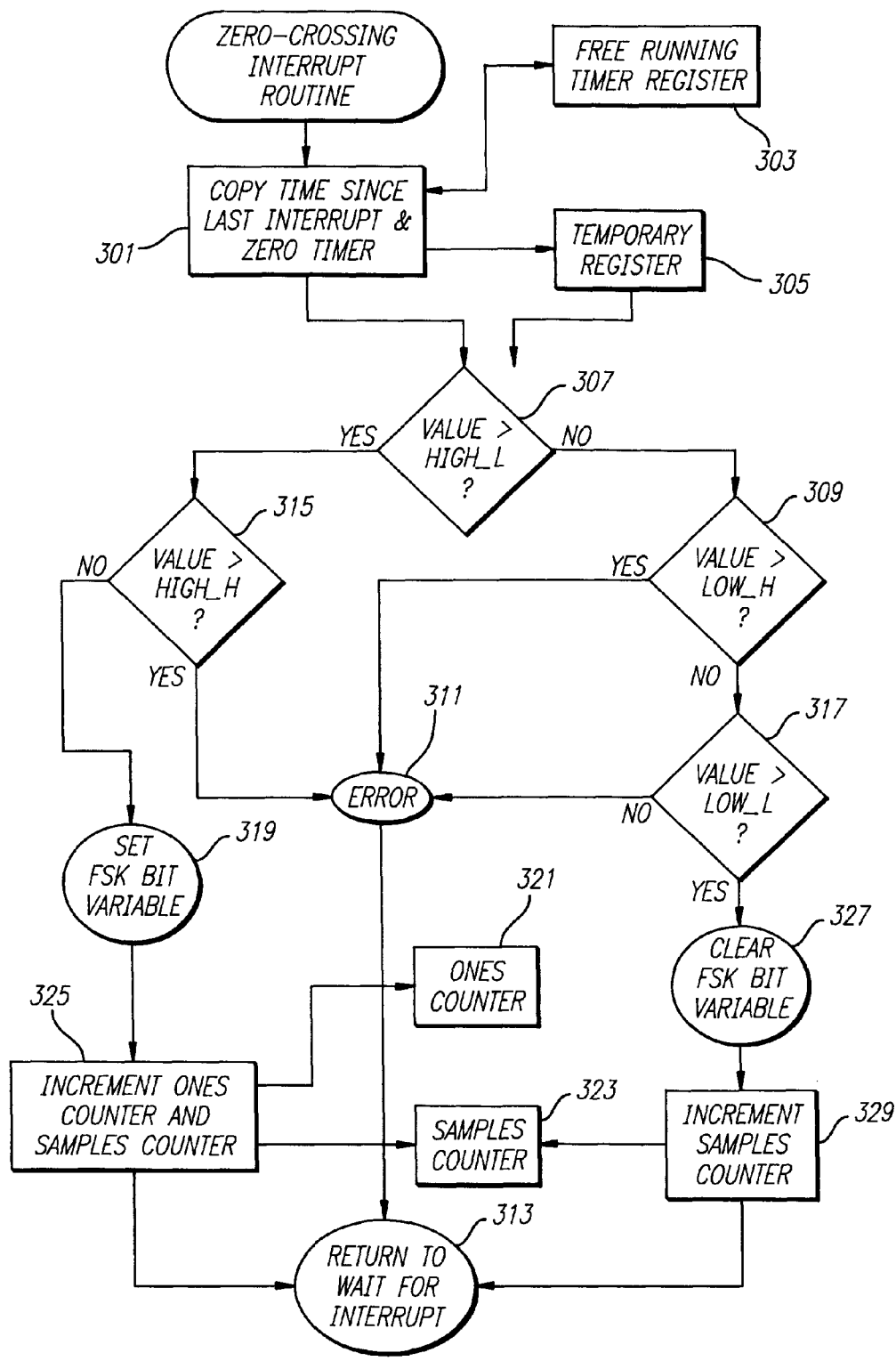
FIG. 19 is the flow diagram for a method of determining the frequency of a single cycle of a frequency-shift-keyed signal.

In FIG. 19 is shown the routine for determining the period of the amplitude modulation of the signal received by the reader 1. The zero-crossing detector 85 (FIG. 6) produces an interrupt of the microprocessor 17 (FIG. 1) each time a positive zero crossing occurs in the amplitude modulation of the received signal. This interrupt causes the routine of FIG. 19 to be executed.

In step 301 the time since the last interrupt occurred is copied from the free running timer register 303 into the temporary register 305 and the timer register is then cleared.

The value in the temporary register is compared with a predetermined high value high_L for the low FSK frequency L in step 307. If the value is less than or equal to high_L, the value is compared with the predetermined low value low_H of the high FSK frequency H in step 309. If the value is greater than low_H, an error is declared in step 311 and the routine returns to the beginning in step 313 to wait for the next interrupt.

If the value is found to be greater than high_L in step 307, the value is compared with the predetermined high value high_H of the high FSK frequency H in step 315. If the value is greater than high_H, an error is declared in step 311 and the routine returns to the beginning in step 313 to wait for the next interrupt.

If the value is found to be less than or equal to low_H in step 309 and less than or equal to the predetermined low value low_L of the low FSK frequency L in step 317, an error is declared in step 311 and the routine returns to the beginning in step 313 to wait for the next interrupt.

If the value is found to be less than or equal to high_H in step 315, it is concluded that the high FSK frequency was transmitted by the tag and the FSK bit variable is set to ONE in step 319. The ONEs counter 321 and the SAMPLES counter 323 are incremented in step 325 and the routine returns to the beginning in step 313 to wait for the next interrupt.

If the value is found to be greater than low_L in step 317, it is concluded that the low FSK frequency was transmitted by the tag and the FSK bit variable is reset to ZERO in step 319. The SAMPLES counter 323 is incremented in step 329 and the routine returns to the beginning in step 313 to wait for the next interrupt.

Figure 20:
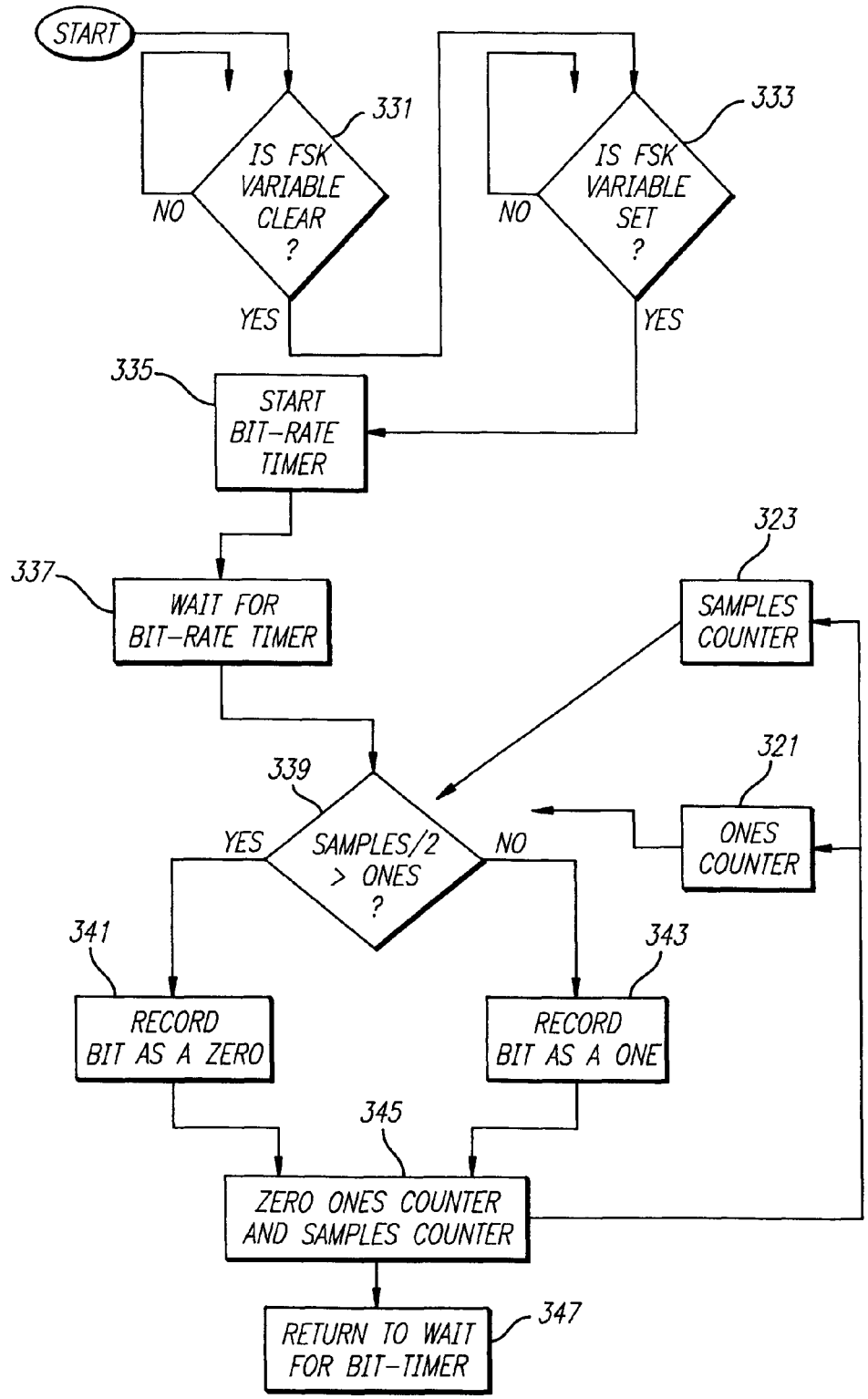
FIG. 20 is the flow diagram for a method of determining the frequency of a frequency-shift-keyed signal during a bit period.

The routine shown in FIG. 20 starts when the reader initiates an interrogation of a tag. The microprocessor waits in step 331 until the FSK variable is ZERO and then waits in step 333 until the FSK variable is ONE. A transition from ZERO to ONE indicates the beginning of a bit period and the bit rate timer 335 is started when this occurs.

The microprocessor waits in step 337 for the beginning of the next bit period as indicated by the bit-rate timer 335 and then proceeds in step 339 to compare half the value in the SAMPLES counter 323 of FIG. 19 with the value in the ONEs counter 321 of FIG. 19. If the SAMPLES value divided by two is greater than the ONEs value, the bit received during the current bit period is recorded as a ZERO in step 341. If the SAMPLES value divided by two is less than or equal to the ONEs value, the bit received during the current bit period is recorded as a ONE in step 343.

The ONEs counter 321 and the SAMPLES counter 321 are cleared in step 345 and the routine returns in step 347 to step 337 to wait for the beginning of the next pit period.

The preferred embodiment has been described in terms of a tag 3 that receives its power from the alternating magnetic field generated by the reader 1. The reader-tag system described herein also functions satisfactorily if the tag is powered by an independent power source such as a battery. It is also not essential that the tag transmit its information while the reader is generating an alternating magnetic field. For example, the reader may trigger a tag by generating an alternating magnetic field for a time period long enough for the tag to obtain timing information. Then the reader ceases to generate its alternating magnetic field and listens for a response from the tag.

In the preferred embodiment, the reader 1 and the tag 3 communicate data to each other by phase shift keying and/or frequency shift keying a periodic signal which in turn modulates the amplitude of a carrier signal. Other acceptable ways of communicating data are by phase shift keying and/or frequency shift keying a periodic signal which in turn modulates the phase or frequency of the carrier signal and by phase shift keying and/or frequency shift keying the carrier signal directly.

What is claimed is:

1. A tag for use with a reader, the reader transmitting a bit-timing clock signal originating in the reader to the tag, the tag comprising:
- a coil;
- a capacitor;
- a means for coupling the capacitor to the coil;
- a means for driving the coil with a driving signal;
- a means for generating the driving signal;
- a means for generating a bit-timing clock signal synchronized to the bit-timing clock signal originating in the reader;
- a means for embedding a sequence of bits to be communicated to a reader in the driving signal, the start of each bit being controlled by the bit-timing clock signal generated in the tag and synchronized to the bit-timing clock signal originating in the reader.

* * * * *